United States Patent
Zhang et al.

(10) Patent No.: US 10,113,854 B2
(45) Date of Patent: Oct. 30, 2018

(54) DEVICE AND METHOD FOR DETECTING WALL ABRASION OF SOLID FILLER FEEDING WELL

(71) Applicant: CHINA UNIVERSITY OF MINING AND TECHNOLOGY, Xuzhou, Jiangsu (CN)

(72) Inventors: Jixiong Zhang, Jiangsu (CN); Wenyue Qi, Jiangsu (CN); Qiang Zhang, Jiangsu (CN); Peng Huang, Jiangsu (CN); Qiang Sun, Jiangsu (CN)

(73) Assignee: CHINA UNIVERSITY OF MINING AND TECHNOLOGY, Xuzhou, Jiangsu (CN)

( * ) Notice: Subject to any disclaimer, the term of this patent is extended or adjusted under 35 U.S.C. 154(b) by 3 days.

(21) Appl. No.: 15/116,800

(22) PCT Filed: Jun. 16, 2015

(86) PCT No.: PCT/CN2015/081521
§ 371 (c)(1),
(2) Date: Aug. 4, 2016

(87) PCT Pub. No.: WO2016/034005
PCT Pub. Date: Mar. 10, 2016

(65) Prior Publication Data
US 2017/0184389 A1    Jun. 29, 2017

(30) Foreign Application Priority Data

Sep. 3, 2014 (CN) .......................... 2014 1 0447025

(51) Int. Cl.
*E21B 47/00* (2012.01)
*E21B 47/08* (2012.01)
(Continued)

(52) U.S. Cl.
CPC ............ *G01B 7/13* (2013.01); *E21B 47/0006* (2013.01); *E21B 47/08* (2013.01); *E21B 47/09* (2013.01);
(Continued)

(58) Field of Classification Search
USPC .......................... 33/719, 722–774, 542–544
See application file for complete search history.

(56) References Cited

U.S. PATENT DOCUMENTS 3,977,468 A    8/1976  Brewer et al.
4,848,149 A *  7/1989  Fiorentino .............. G01F 23/04
                                                         250/577

(Continued)

FOREIGN PATENT DOCUMENTS

CN    201241699 Y    5/2009
CN    202403690 U    8/2012
(Continued)

OTHER PUBLICATIONS

PCT International Search Report, PCT/CN2015/081521, dated Oct. 9, 2015 (with English translation).
(Continued)

*Primary Examiner* — Manish S Shah
*Assistant Examiner* — Jean Morello
(74) *Attorney, Agent, or Firm* — TraskBritt, P.C.

(57) ABSTRACT

Disclosed is a device for detecting wall abrasion of a solid-filling feeding well and a detection method thereof. The device comprises a well wall abrasion detector, a horizontal displacement meter, a vertical displacement monitor, and a limit guide rod. One end of the limit guide rod is connected to the well wall abrasion detector. The signal output terminal of the well wall abrasion detector is connected to the signal input terminal of the horizontal displacement meter, and the other end of the limit guide rod
(Continued)

passes through the vertical displacement monitor for slidable setting. This disclosure mainly utilizes a resistance strain displacement sensor to detect the abrasion and deformation degree of the well wall, determines the position of damages with the vertical displacement monitor, and draws wall abrasion curves by using the obtained data. The device provided is easy to use, has low cost, has high reliability, and can effectively detect the wall abrasion condition of a solid-filling feeding well, thereby providing a basis for ensuring the working efficiency of the feeding well.

14 Claims, 3 Drawing Sheets

(51) Int. Cl.
*E21B 47/09* (2012.01)
*E21F 15/00* (2006.01)
*G01B 3/46* (2006.01)
*G01B 5/12* (2006.01)
*G01B 7/13* (2006.01)
*G01B 7/16* (2006.01)

(52) U.S. Cl.
CPC ............... *E21F 15/00* (2013.01); *G01B 3/46* (2013.01); *G01B 5/12* (2013.01); *G01B 7/18* (2013.01)

(56) References Cited

U.S. PATENT DOCUMENTS

| | | | |
|---|---|---|---|
| 5,092,056 A | | 3/1992 | Deaton |
| 5,155,922 A | * | 10/1992 | Cooper ................ B66B 7/06 33/735 |
| 7,661,308 B2 | * | 2/2010 | Eggleston ............ E21B 19/22 33/715 |
| 7,669,668 B2 | * | 3/2010 | Martinez ............ E21B 47/024 175/40 |
| 2015/0285939 A1 | * | 10/2015 | Donderici ............ G01V 3/28 324/324 |

FOREIGN PATENT DOCUMENTS

| | | |
|---|---|---|
| CN | 202451138 U | 9/2012 |
| CN | 104265280 A | 1/2015 |
| WO | 2016034005 A1 | 3/2016 |

OTHER PUBLICATIONS

PCT International Written Opinion, PCT/CN2015/081521, dated Oct. 9, 2015.

* cited by examiner

DEVICE AND METHOD FOR DETECTING WALL ABRASION OF SOLID FILLER FEEDING WELL

CROSS-REFERENCE TO RELATED APPLICATIONS

This application is a national phase entry under 35 U.S.C. § 371 of International Patent Application PCT/CN2015/081521, filed Jun. 16, 2015, designating the United States of America and published as International Patent Publication WO 2016/034005 A1 on Mar. 10, 2016, which claims the benefit under Article 8 of the Patent Cooperation Treaty to Chinese Patent Application Serial No. 201410447025.6, filed Sep. 3, 2014.

TECHNICAL FIELD

This application describes a device and a method for detecting well wall abrasion, which are especially suitable for detecting wall abrasion of a solid-filling feeding well.

BACKGROUND

A feeding well takes an important role in a solid-filling coal mining system, and is the throat for transport of the solid filling material. Hence, the serious wall abrasion of the feeding well has direct impact on the progress of fill mining. The surface deformation of the feeding well is mainly the result of abrasion by solid materials. At present, devices for detecting well wall deformation mainly include panoramic well wall scanning devices and other well wall surface deformation sensors. On one hand, these devices are expansive; on the other hand, they cannot measure well wall abrasion and deformation intuitively. Therefore, it is especially important to develop a device and a method for detecting wall abrasion of a solid-filling feeding well that are convenient to install and have low cost.

BRIEF SUMMARY

Described is a device and a method for detecting wall abrasion of a solid-filling feeding well that is convenient to install, easy to operate, has high reliability, can effectively detect the wall abrasion condition of a solid-filling feeding well and provide a basis for ensuring the working efficiency of the feeding well.

A device for detecting wall abrasion of a solid-filling feeding well, the device comprising a well wall abrasion detector, a horizontal displacement meter, a vertical displacement monitor, and a limit guide rod, wherein, one end of the limit guide rod is connected to the well wall abrasion detector, the signal output terminal of the well wall abrasion detector is connected to the signal input terminal of the horizontal displacement meter, and the other end of the limit guide rod passes through the vertical displacement monitor for slidable setting.

An abrasion curve of the well wall at an azimuth angle along the vertical direction can be drawn by using the data detected by the vertical displacement monitor and the data acquired by the horizontal displacement meter.

Moreover, the well wall abrasion detector comprises several sets of detection arms. Each set of detection arms comprises a resistance strain displacement sensor, a signal amplifier, an electromagnet, a power supply, a displacement transfer rod, a fine-tuning nut, and a damage detection head. The resistance strain displacement sensor, power supply, and signal amplifier are fixed in each set of detection arms, respectively. The electromagnet is fixed on the resistance strain displacement sensor. One end of the displacement transfer rod is disposed at a position corresponding to the electromagnet; the other end of the displacement transfer rod is fixed to the damage detection head via the fine-tuning nut. The displacement transfer rod can extend and retract elastically in an axial direction. The power supply supplies power to the electromagnet. The signal output terminal of the resistance strain displacement sensor is connected to the signal input terminal of the signal amplifier, and the signal output terminal of the signal amplifier is connected to the signal input terminal of the horizontal displacement meter.

The damage detection head can be adjusted with the fine-tuning nut to change the excircle diameter of the well wall abrasion detector. As the well wall abrasion detector moves into the well wall, the damage detection head disposed on the other end of the displacement transfer rod will move downward along the injured well wall and reciprocate by extension and retraction in the direction perpendicular to the injured well wall at the same time, thereby driving the displacement transfer rod to reciprocate horizontally by extension and retraction. Thus, the resistance strain displacement sensor disposed on one end of the displacement transfer rod at a position corresponding to the electromagnet transmits the data signal of horizontal reciprocating displacement of the displacement transfer rod to the horizontal displacement meter via the signal amplifier.

Moreover, the detection arm further comprises a return spring and a detection arm housing. One end of the displacement transfer rod is limited in the detection arm housing in a radial direction, and is driven by the return spring disposed in the detection arm to extend and retract elastically along the axial direction.

Moreover, the vertical displacement monitor is fixedly disposed on a detection platform, which is built at the entry of a well wall.

Moreover, the horizontal displacement meter is fixedly disposed on the detection platform.

Moreover, the device further comprises a rotation controller. One end of the limit guide rod is rotatably connected to the well wall abrasion detector. The signal output terminal of the rotation controller is connected to the signal input terminal of the well wall abrasion detector so that the well wall abrasion detector is controlled by the rotation controller to rotate horizontally in the well wall.

A detection method utilizing the device for detecting wall abrasion of a solid-filling feeding well, the method comprising the following steps:

a. determining the inner diameter $d_0$ of the feeding well; turning on the power switch; and adjusting the damage detection head with the fine-tuning nut so that the excircle diameter d of the well wall abrasion detector is $d=d_0+\Delta d$;

b. when the equipment on the detection platform is ready, adjusting the displacement meter and the vertical displacement monitor to a same data recording frequency, and placing the well wall abrasion detector, together with the limit guide rod, into the feeding well to be detected. At this time, the well wall abrasion detector is disposed at a segment of the well shaft without abrasion near the well mouth and records the initial reading $m_0$ on the horizontal displacement meter, the initial reading $n_0$ on the vertical displacement monitor, and the distance h between the well wall abrasion detector and the well mouth;

c. when the preparation is complete, moving the well wall abrasion detector together with the limit guide rod downward along the well wall at a constant speed, starting data recording with the horizontal displacement meter and the vertical displacement monitor, and fixedly connecting each segment of limit guide rod until the well wall abrasion detector reaches the well bottom;

d. subtracting the initial reading $m_0$ from the data recorded by the horizontal displacement meter to obtain a first set of data; subtracting ($m_0$–h) from the data recorded by the vertical displacement monitor to obtain a second set of data; taking the second set of data as horizontal coordinate and taking the first set of data as vertical coordinate to obtain a well wall abrasion curve at that azimuth angle;

e. lifting the well wall abrasion detector to the well mouth, turning it by 45° in relation to its original position along the circumferential direction of the well shaft, and repeating the steps a through d;

wherein, "$d_0$" is the inner diameter of the well wall of the feeding well before abrasion, "$\Delta d$" is the increment of excircle diameter of the well wall abrasion detector obtained by adjusting the damage detection head with the fine-tuning nut, "d" is the excircle diameter of the well wall abrasion detector to be moved into the feeding well, "$m_0$" is the initial reading of the horizontal displacement meter when the well wall abrasion detector is to be moved into the feeding well, and "$n_0$" is the initial reading of the vertical displacement monitor when the well wall abrasion detector is to be moved into the feeding well.

Moreover, the value of "$\Delta d$" is within a range of 30 mm to 40 mm.

Beneficial effects: This disclosure can accomplish detection of wall abrasion of a feeding well at different azimuths. At the same time, the specific position of abrasion can be determined by the vertical displacement monitor. An abrasion curve of the well wall at an azimuth angle along the vertical direction can be drawn by using the data detected by the vertical displacement monitor and the data acquired by the horizontal displacement meter. Then, the azimuth angle of the well wall abrasion detector is changed, so as to finally draw the abrasion curves of the well wall at different azimuths. The condition of wall abrasion of the feeding well can be determined according to the abrasion curves of the well wall, and the well wall of the feeding well can be timely repaired to ensure the working efficiency of the feeding well. At the same time, the device provided in this disclosure has advantages including easy installation, easy use, low cost, and high reliability, etc., and has obvious beneficial effects for improving the working efficiency of the feeding system.

DETAILED DESCRIPTION

Figure 1:
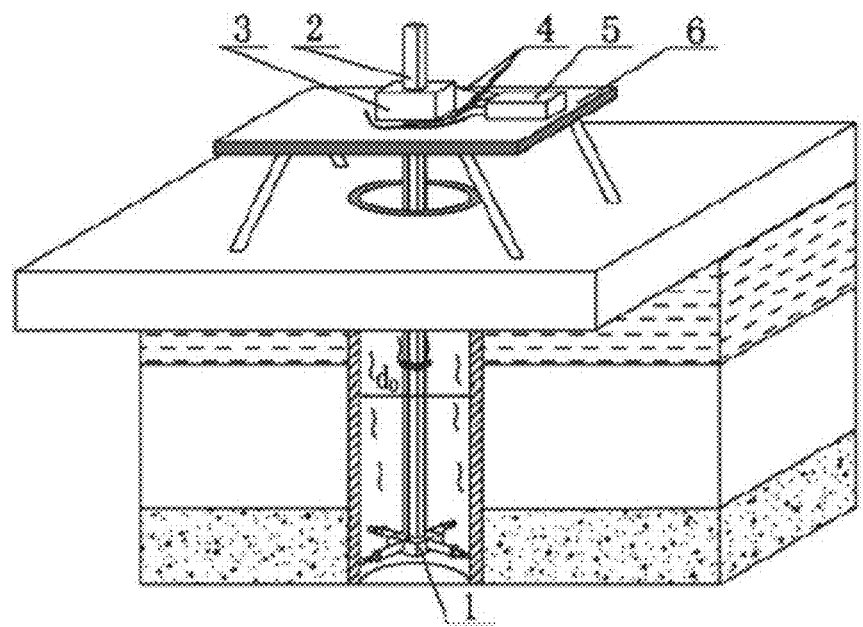
FIG. 1 is a 3-D layout diagram of the device for detecting wall abrasion of a solid-filling feeding well.
Figure 2:
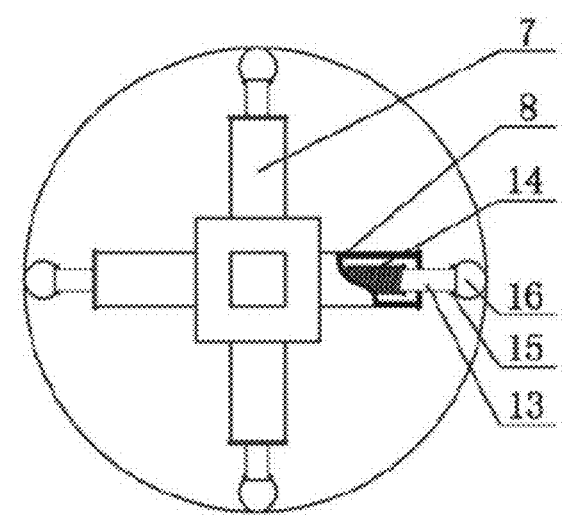
FIG. 2 is a plan view of the well wall abrasion detector in a non-working state.
Figure 3:
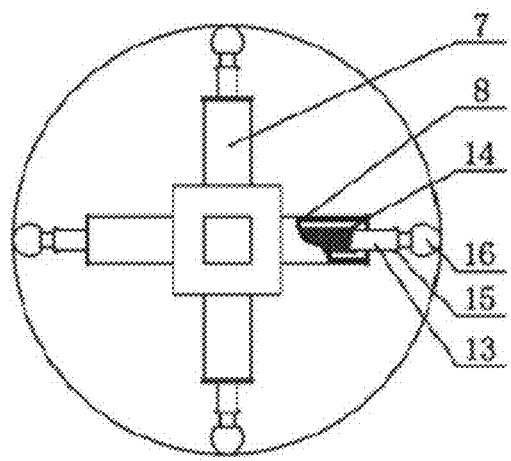
FIG. 3 is a plan view of the well wall abrasion detector in a working state.
Figure 4:
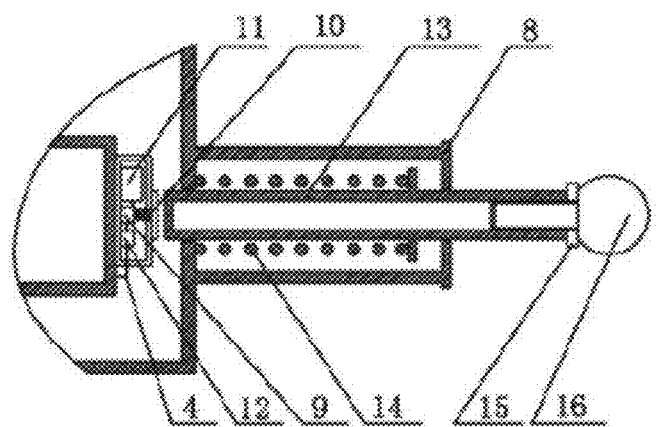
FIG. 4 is a cross-sectional view of the detection arm in a non-working state.
Figure 5:
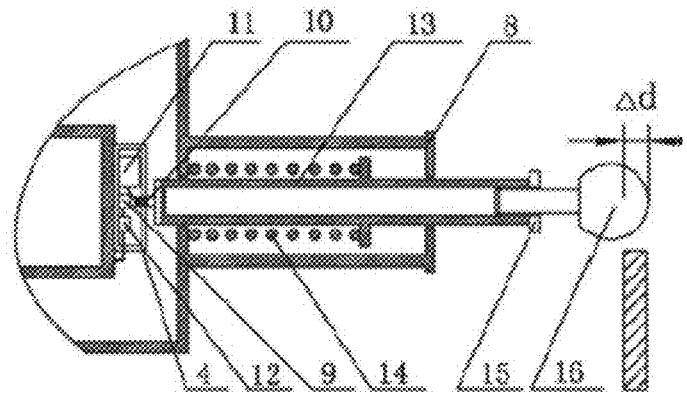
FIG. 5 is a cross-sectional view of the detection arm in commissioning state.
Figure 6:
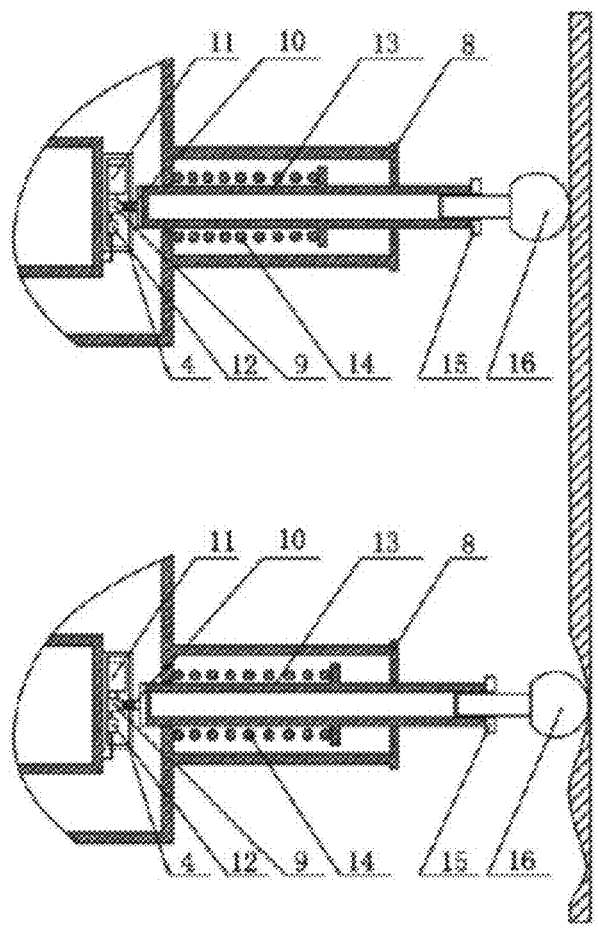
FIG. 6 is a cross-sectional view of the detection arm in a working state.

This disclosure will be further described below with reference to the accompanying drawings.

A device for detecting wall abrasion of solid-filling feeding well, which, in the first example, comprises: a well wall abrasion detector 1, a horizontal displacement meter 5, a vertical displacement monitor 3, and a limit guide rod 2. One end of the limit guide rod 2 is connected to the well wall abrasion detector 1. To determine the condition of wall abrasion via the horizontal displacement meter 5, the signal output terminal of the well wall abrasion detector 1 is connected to the signal input terminal of the horizontal displacement meter 5. The other end of the limit guide rod 2 passes through the vertical displacement monitor 3 for slidable setting. The lowering position of the well wall abrasion detector 1 is determined according to the relative displacement between the vertical displacement monitor 3 and the limit guide rod 2. The condition of well wall abrasion can be detected intuitively by using the data detected by the vertical displacement monitor 3 and the data acquired by the horizontal displacement meter 5.

The well wall abrasion detector 1 comprises several sets of detection arms 7, and each set of detection arms 7 comprises a resistance strain displacement sensor 9, a signal amplifier 12, an electromagnet 10, a power supply 11, a displacement transfer rod 13, a fine-tuning nut 15, a return spring 14, a detection arm housing 8, and a damage detection head 16. The resistance strain displacement sensor 9, power supply 11, and signal amplifier 12 are fixed side by side in each set of detection arms 7. The electromagnet 10 is fixed on the resistance strain displacement sensor 9. One end of the displacement transfer rod 13 is limited in the detection arm housing 8 in a radial direction and is disposed at a position corresponding to the electromagnet 10. The other end of the displacement transfer rod 13 is fixed to the damage detection head 16 via the fine-tuning nut 15. The displacement transfer rod 13 is driven by the return spring 14 disposed in the detection arm 7 to extend and retract elastically along an axial direction. The power supply 11 supplies power to the electromagnet 10. The signal output terminal of the resistance strain displacement sensor 9 is connected to the signal input terminal of the signal amplifier 12, and the signal output terminal of the signal amplifier 12 is connected to the signal input terminal of the horizontal displacement meter 5. In this disclosure, the signal amplifier 12 is connected to the horizontal displacement meter 5 through an external data transmission line 4. The vertical displacement monitor 3 is fixedly disposed on a detection platform 6, and the horizontal displacement meter 5 is fixedly disposed on the detection platform 6. The detection platform 6 is built at the entry of the well wall.

This disclosure can accomplish detection of wall abrasion of a feeding well at different azimuths. At the same time, the specific position of abrasion can be determined by the vertical displacement monitor 3. An abrasion curve of the well wall at an azimuth angle along the vertical direction can be drawn by using the data detected by the vertical displacement monitor 3 and the data acquired by the horizontal displacement meter 5. Then, the azimuth angle of the well wall abrasion detector can be changed, so as to detect the condition of wall abrasion at different azimuths.

A detection method of the device for detecting wall abrasion comprises the following steps:

a. determining the inner diameter $d_0$ of the feeding well, turning on the switch of power supply 11, and adjusting the damage detection head 16 with the fine-tuning nut 15, so that the excircle diameter d of the well wall abrasion detector 1 is d=$d_0$+$\Delta d$, wherein, the value of $\Delta d$ is within a range of 30 mm to 40 mm;

b. when the equipment on the detection platform 6 is ready, adjusting the displacement meter 5 and the vertical displacement monitor 3 to a same data recording frequency; and placing the well wall abrasion detector 1, together with the limit guide rod 2, into the feeding well to be detected. At this time, the well wall abrasion detector 1 is disposed at a segment of the well shaft without abrasion near the well mouth and records the initial reading $m_0$ on the horizontal displacement meter 5, the initial reading $n_0$ on the vertical displacement monitor 3, and the distance h between the well wall abrasion detector 1 and the well mouth;

c. when the preparation is complete, moving the well wall abrasion detector 1, together with the limit guide rod 2, downward along the well wall at a constant speed; starting data recording with the horizontal displacement meter 5 and the vertical displacement monitor 3, and fixedly connecting each segment of limit guide rod 2, until the well wall abrasion detector 1 reaches the well bottom;

d. subtracting the initial reading $m_0$ from the data recorded by the horizontal displacement meter 5 to obtain a first set of data; subtracting ($m_0$–h) from the data recorded by the vertical displacement monitor 3 to obtain a second set of data; taking the second set of data as horizontal coordinate and taking the first set of data as vertical coordinate to obtain a wall abrasion curve at that azimuth angle;

e. lifting the well wall abrasion detector 1 to the well mouth; turning it by 45° in relation to its original position along the circumferential direction of the well shaft; and repeating the steps a~d;

wherein, "$d_0$" is the inner diameter of the well wall of the feeding well before abrasion; "$\Delta d$" is the increment of excircle diameter of the well wall abrasion detector 1 obtained by adjusting the damage detection head 16 with the tuning nut 15; "d" is the excircle diameter of the well wall abrasion detector 1 to be moved into the feeding well; "$m_0$" is the initial reading of the horizontal displacement meter 5 when the well wall abrasion detector 1 is to be moved into the feeding well; "$n_0$" is the initial reading of the vertical displacement monitor 3 when the well wall abrasion detector 1 is to be moved into the feeding well; and "h" is the distance of the well wall abrasion detector 1 from the well mouth. Thus, an abrasion curve of well wall in the vertical direction at an azimuth angle can be drawn by using the data detected by the vertical displacement monitor and the data acquired by the horizontal displacement meter, and the initial reading $m_0$ on the horizontal displacement meter 5 and the initial reading $n_0$ on the vertical displacement monitor 3.

The second example: The device for detecting wall abrasion of a solid-filling feeding well further comprises a rotation controller. One end of the limit guide rod 2 is horizontally rotatably connected to the well wall abrasion detector 1. The signal output terminal of the rotation controller is connected to the signal input terminal of the well wall abrasion detector 1 so that the well wall abrasion detector 1 is controlled by the rotation controller 1 to rotate horizontally at the bottom of the well wall. After the well wall abrasion detector 1 enters the well and accomplishes the first detection, the well wall abrasion detector 1 does not need to be taken out. Instead, the well wall abrasion detector 1 is turned by 45° with the rotation controller at the well bottom, and then is lifted up gradually, so that the well wall abrasion detector 1 can accomplish detection of wall abrasion at another azimuth angle "by the way" in the lifting process. Thus, the operation is simpler and quicker.

The preferred embodiments of this disclosure have been described above; but it should be pointed out that various modifications and variations made by the person having ordinary skill in the art without departing from the principle of this disclosure also fall into the protection scope of this application.

The invention claimed is:

1. A device for detecting wall abrasion of a solid-filling feeding well, comprising a well wall abrasion detector, a horizontal displacement meter, a vertical displacement monitor, and a limit guide rod, wherein, one end of the limit guide rod is connected to the well wall abrasion detector, a signal output terminal of the well wall abrasion detector is connected to a signal input terminal of the horizontal displacement meter, and another end of the limit guide rod passes through the vertical displacement monitor for slidable setting, wherein: the well wall abrasion detector comprises several sets of detection arms, and each set of detection arms comprises a resistance strain displacement sensor, a signal amplifier, an electromagnet, a power supply, a displacement transfer rod, a fine-tuning nut, and a damage detection head, the resistance strain displacement sensor, power supply, and signal amplifier are fixed in each set of detection arms, respectively, the electromagnet is fixed on the resistance strain displacement sensor, one end of the displacement transfer rod is disposed at a position corresponding to the electromagnet, the other end of the displacement transfer rod is fixed to the damage detection head via the fine-tuning nut, the displacement transfer rod can extend and retract elastically along an axial direction, the power supply supplies power to the electromagnet, the signal output terminal of the resistance strain displacement sensor is connected to the signal input terminal of the signal amplifier, and the signal output terminal of the signal amplifier is connected to the signal input terminal of the horizontal displacement meter.

2. The device according to claim 1, wherein:
the detection arm further comprises a return spring and a detection arm housing, one end of the displacement transfer rod is limited in the detection arm housing in a radial direction, and is driven by the return spring disposed in the detection arm to extend and retract elastically in the axial direction.

3. The device according to claim 1, wherein:
the device further comprises a rotation controller, one end of the limit guide rod is rotatably connected to the well wall abrasion detector, and a signal output terminal of the rotation controller is connected to a signal input terminal of the well wall abrasion detector.

4. The device according to claim 1, wherein:
the vertical displacement monitor is fixedly disposed on a detection platform, which is built at the entry of a well wall.

5. The device according to claim 4, wherein:
the horizontal displacement meter is fixedly disposed on the detection platform.

6. A method for detecting wall abrasion of a solid-filling feeding well with the device of claim 1, the method comprising:

a. determining the inner diameter $d_0$ of a feeding well, actuating the power supply, and fine tuning the damage detection head so that the excircle diameter d of the well wall abrasion detector is $d=d_0+\Delta d$;

b. when the equipment on the detection platform is ready, adjusting the displacement meter and the vertical displacement monitor to a same data recording frequency, placing the well wall abrasion detector together with a limit guide rod into the feeding well to be detected, and at this time the well wall abrasion detector being disposed at a segment of the well shaft without abrasion near the well mouth and recording the initial reading ma on the horizontal displacement meter, the initial reading no on the vertical displacement monitor, and the distance h between the well wall abrasion detector and the well mouth;

c. when the preparation is completed, moving the well wall abrasion detector together with the limit guide rod downward along the well wall at a constant speed, starting data recording with the horizontal displacement meter and the vertical displacement monitor, and connecting each segment of limit guide rod fixedly, until the well wall abrasion detector reaches the well bottom;

d. subtracting the initial reading $m_0$ from the data recorded by the horizontal displacement meter to obtain a first set of data; subtracting ($m_0$–h) from the data recorded by the vertical displacement monitor to obtain a second set of data; taking the second set of data as horizontal coordinate and taking the first set of data as vertical coordinate to obtain a wall abrasion curve at that azimuth angle;

e. lifting the well wall abrasion detector to the well mouth, turning it by 45° in relation to its original position along the circumferential direction of the well shaft, and f. repeating a, b, c, and d;

wherein, "$d_0$" is the inner diameter of the well wall of the feeding well before abrasion, "$\Delta d$" is the increment of excircle diameter of the well wall abrasion detector obtained by adjusting the damage detection head with the fine-tuning nut, "d" is the excircle diameter of the well wall abrasion detector to be moved into the feeding well, "$m_0$" is the initial reading of the horizontal displacement meter when the well wall abrasion detector is to be moved into the feeding well, and "$n_0$" is the initial reading of the vertical displacement monitor when the well wall abrasion detector is to be moved into the feeding well.

7. The method according to claim 6, wherein the value of "$\Delta d$" is within a range of 30 mm to 40 mm.

8. A method for detecting wall abrasion of a solid-filling feeding well with a device for detecting wall abrasion of a solid-filling feeding well, wherein, the method comprises the following steps:

a. determining inner diameter $d_0$ of the feeding well, turning on a switch of a power supply, and adjusting a damage detection head with a fine-tuning nut, so that an excircle diameter d of the well wall abrasion detector is $d=d_0+\Delta d$;

b. when equipment on a detection platform is ready, adjusting a displacement meter and a vertical displacement monitor to a same data recording frequency, placing the well wall abrasion detector together with a limit guide rod into the feeding well to be detected, and at this time the well wall abrasion detector being disposed at a segment of a well shaft without abrasion near a well mouth and recording an initial reading $m_0$ on a horizontal displacement meter, an initial reading no on a vertical displacement monitor, and distance h between the well wall abrasion detector and the well mouth;

c. when the preparation is completed, moving the well wall abrasion detector together with the limit guide rod downward along the well wall at a constant speed, starting data recording with the horizontal displacement meter and the vertical displacement monitor, and fixedly connecting each segment of limit guide rod until the well wall abrasion detector reaches the well bottom;

d. subtracting the initial reading ma from the data recorded by the horizontal displacement meter to obtain a first set of data; subtracting ($m_0$–h) from the data recorded by the vertical displacement monitor to obtain a second set of data; taking the second set of data as horizontal coordinate and taking the first set of data as vertical coordinate to obtain a wall abrasion curve at that azimuth angle;

e. lifting the well wall abrasion detector to the well mouth, turning it by 45° in relation to its original position along the circumferential direction of the well shaft, and repeating the steps a-d;

wherein, "$d_0$" is the inner diameter of well wall of the feeding well before abrasion, "$\Delta d$" is the increment of excircle diameter of the well wall abrasion detector obtained by adjusting the damage detection head with the fine-tuning nut, "d" is the excircle diameter of the well wall abrasion detector to be moved into the feeding well, "$m_0$" is the initial reading of the horizontal displacement meter when the well wall abrasion detector is to be moved into the feeding well, and "no" is the initial reading of the vertical displacement monitor when the well wall abrasion detector is to be moved into the feeding well.

9. The method according to claim 8, wherein: the value of "$\Delta d$" is within a range of 30 mm to 40 mm.

10. A device for detecting wall abrasion of a solid-filling feeding well, the device comprising:
   a well wall abrasion detector,
   a horizontal displacement meter,
   a vertical displacement monitor,
   a limit guide rod, and
   a rotation controller,
   wherein
      a first end of the limit guide rod is rotatably connected to the well wall abrasion detector,
      a signal output terminal of the well wall abrasion detector is connected to a signal input terminal of the horizontal displacement meter,
      the signal output terminal of the rotation controller is connected to the signal input terminal of the well wall abrasion detector, and
      a second end of the limit guide rod passes through the vertical displacement monitor for slidable setting.

11. The device of claim 10, wherein the well wall abrasion detector comprises a plurality of sets of detection arms, and each set of detection arm comprises a resistance strain displacement sensor, a signal amplifier, an electromagnet, a power supply, a displacement transfer rod, a fine-tuning nut, and a damage detection head, the resistance strain displacement sensor, power supply, and signal amplifier are fixed in each set of detection arms, respectively, the electromagnet is fixed on the resistance strain displacement sensor, a first end of the displacement transfer rod is disposed at a position corresponding to the electromagnet, a second end of the displacement transfer rod is fixed to the damage detection head via the fine-tuning nut, the displacement transfer rod can extend and retract elastically along an axial direction, the power supply supplies power to the electromagnet, the signal output terminal of the resistance strain displacement sensor is connected to the signal input terminal of the signal amplifier, and the signal output terminal of the signal amplifier is connected to the signal input terminal of the horizontal displacement meter.

12. The device of claim 11, wherein the detection arm further comprises:
   a return spring and a detection arm housing,
wherein one end of the displacement transfer rod is limited in the detection arm housing in a radial direction, and is driven by the return spring disposed in the detection arm to extend and retract elastically in an axial direction.

13. The device of claim 10, wherein the vertical displacement monitor is fixedly disposed on a detection platform, which is built at the entry of a well wall.

14. The device of claim 13, wherein the horizontal displacement meter is fixedly disposed on the detection platform.

* * * * *